US011960618B2

(12) United States Patent
Hasegawa et al.

(10) Patent No.: US 11,960,618 B2
(45) Date of Patent: Apr. 16, 2024

(54) ACCESS RIGHTS BASED SEARCH RESULTS

(71) Applicant: International Business Machines Corporation, Armonk, NY (US)

(72) Inventors: Tohru Hasegawa, Tokyo (JP); Shunsuke Ishikawa, Shinjuku-ku (JP); Yasumasa Kajinaga, Funabashi (JP); Keisuke Nitta, Koshigaya (JP); Daiki Tsuzuku, Kawasaki (JP)

(73) Assignee: International Business Machines Corporation, Armonk, NY (US)

( * ) Notice: Subject to any disclaimer, the term of this patent is extended or adjusted under 35 U.S.C. 154(b) by 444 days.

(21) Appl. No.: 17/446,702

(22) Filed: Sep. 1, 2021

(65) Prior Publication Data

US 2023/0065222 A1    Mar. 2, 2023

(51) Int. Cl.
*G06F 21/62* (2013.01)
*G06F 16/2457* (2019.01)
*G06F 16/248* (2019.01)
*G06F 16/25* (2019.01)
*G06F 16/26* (2019.01)
*G06F 21/31* (2013.01)
*G06F 21/60* (2013.01)

(52) U.S. Cl.
CPC .... *G06F 21/6227* (2013.01); *G06F 16/24573* (2019.01); *G06F 16/248* (2019.01); *G06F 16/254* (2019.01); *G06F 16/26* (2019.01); *G06F 21/31* (2013.01); *G06F 21/604* (2013.01)

(58) Field of Classification Search
CPC .......... G06F 21/6227; G06F 16/24573; G06F 16/248; G06F 16/254; G06F 16/26; G06F 21/31; G06F 21/604; G06F 16/148
See application file for complete search history.

(56) References Cited

U.S. PATENT DOCUMENTS

| 8,484,208 | B1 | 7/2013 | Raghavan et al. | |
|---|---|---|---|---|
| 9,311,650 | B2 * | 4/2016 | Li | G06Q 30/02 |
| 10,452,662 | B2 * | 10/2019 | Li | G06Q 30/02 |

(Continued)

OTHER PUBLICATIONS

Anonymous, "A Method to Enable Secure Enterprise Search," An IP.com Prior Art Database Technical Disclosure, PCOM000154912D, Jul. 17, 2007, 7 pages.

(Continued)

*Primary Examiner* — Baotran N To
(74) *Attorney, Agent, or Firm* — Yee & Associates, P.C.

(57) ABSTRACT

A computer implemented method searches data. A number of processor units generates a candidate search result using an index for a data source in response to a search query by a user, wherein the candidate search result comprises files accessible by the user based on access control information in the index. The number of processor units generates a completed search result with a set of the files from the candidate search result having a confidentiality level less than or equal to a threshold confidentiality level. The number of processor units determines whether the user has access to a file in the candidate search result in which the file has the confidentiality level greater than the threshold confidentiality level for the data source. The number of processor units adds the file to the completed search result in response to the file being accessible by the user in the data source.

20 Claims, 9 Drawing Sheets

(56) References Cited

U.S. PATENT DOCUMENTS

| | | | |
|---|---|---|---|
| 2007/0016583 A1 | 1/2007 | Lempel et al. | |
| 2008/0282184 A1* | 11/2008 | Rose ................... | G06F 16/48 715/205 |
| 2011/0238696 A1 | 9/2011 | Zeller et al. | |
| 2014/0236942 A1* | 8/2014 | Li ..................... | G06Q 30/02 707/735 |
| 2016/0179818 A1* | 6/2016 | Li ..................... | G06F 16/9535 707/723 |
| 2020/0174778 A1* | 6/2020 | David .................. | H04W 4/80 |
| 2022/0269683 A1* | 8/2022 | Hasegawa ............ | G06F 16/9535 |

OTHER PUBLICATIONS

Subhashini et al., "Confidential Data Identification Using Data Mining Techniques in Data Leakage Prevention System," International Journal of Data Mining & Knowledge Management Process, vol. 5, No. 5, Sep. 2015, 9 pages.

"Considerations for Sensitive Data Within Send Feedback Machine Learning Datasets," 15 pages, with English translation. https://cloud.google.com/solutions/sensitive-data-and-ml-datasets?hl=ja.

"Pre- and post-filtering of search results,""Document-level security, IBM Knowledge Center, IBM Watson Explorer 12.0x, Copyright IBM Corporation 2017, 1 page. https://www.ibm.com/docs/en/watson-explorer/12.0.x?topic=datasets-document-level-security".

\* cited by examiner

400

| | 402 | 404 | CANDIDATE SEARCH RESULT | 406 |
|---|---|---|---|---|
| | NUMBER | DOCUMENT-ID | | CONFIDENTIALITY LEVEL |
| 408 → | 1 | doc1 | | 3 |
| 410 → | 2 | doc2 | | 0 |
| 412 → | 3 | doc3 | | 12 |
| 414 → | 4 | doc4 | | 11 |

| | 502 | COMPLETED SEARCH RESULT | 504 |
|---|---|---|---|
| | NUMBER | | DOCUMENT-ID |
| 506 → | 1 | | doc1 |
| 508 → | 2 | | doc2 |
| 510 → | 3 | | doc4 |

FIG. 5

ACCESS RIGHTS BASED SEARCH RESULTS

BACKGROUND

1. Field

The disclosure relates generally to an improved computer system and more specifically to a checking access rights for search results.

2. Description of the Related Art

Within an organization, users often search for data such as files. These files can be documents, spreadsheets, presentations, slides, videos, programs, or other types of files. Within the organization, these searches can be performed from different sources. For example, users may search filesystems, file servers, database management systems, or other types of data sources.

Some data sources can control access by sitting access rights using access mechanisms such as access control lists to control access to files. The search results can be presented to a particular user based on files are accessible by that user.

SUMMARY

According to one illustrative embodiment, a computer implemented method is provided for searching data. A number of processor units generates a candidate search result using an index for a data source in response to a search query by a user, wherein the candidate search result comprises files accessible by the user based on access control information in the index. The number of processor units generates a completed search result with a set of the files from the candidate search result having a set of confidentiality levels less than or equal to a threshold confidentiality level. The number of processor units determines whether the user has access to a file in the candidate search result in which the file has the confidentiality level greater than the threshold confidentiality level for the data source. The number of processor units adds the file to the completed search result in response to the file being accessible by the user in the data source. The number of processor units presents the completed search result as a response to the search query. According to other illustrative embodiments, a computer system and a computer program product for searching data are provided.

BRIEF DESCRIPTION OF THE DRAWINGS

FIG. 4 is an illustration of a candidate search result in accordance with an illustrative embodiment;

FIG. 5 is an illustration of a completed search result in accordance with an illustrative embodiment;

DETAILED DESCRIPTION

Figure 1:
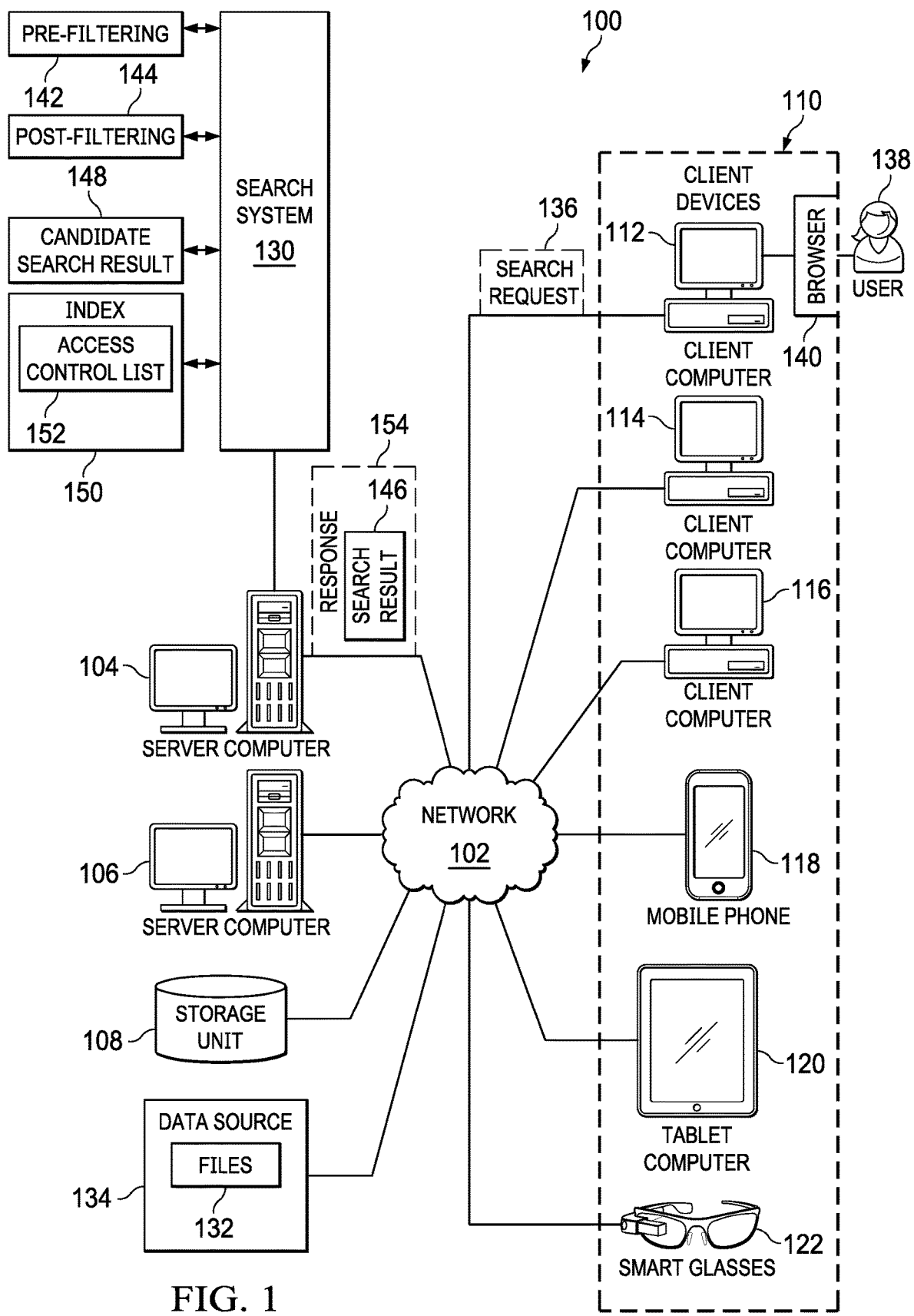
FIG. 1 is a pictorial representation of a network of data processing systems in which illustrative embodiments may be implemented.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The illustrative embodiments recognize and take into account the number of different considerations. For example, the illustrative embodiments recognize and take into account that search results can be filtered any number of different ways. The illustrative embodiments recognize and take into account that search results can be filtered using pre-filtering and post-filtering processes.

The illustrative embodiments recognize and take into account that indexes can be used to increase the speed at which data can be searched. The illustrative embodiments recognize and take into account that these indexes can include access control information that was current at the time the indexes were generated. The illustrative embodiments recognize and take into account that with prefiltering, the search results can be compared with the access control information present when the index was created.

The illustrative embodiments recognize and take into account that that access control information can change. For example, the illustrative embodiments recognize and take into account that can change over time. As result, the illustrative embodiments recognize and take into account that the access control rights that a user currently has may not be the same as reflected by the access control information in the index. The illustrative embodiments recognize and take into account that pre-filtering can be useful when access rights of users do not change or do not change frequently.

Illustrative recognize and take into account that post-filtering can be performed when access rights files increase with a frequency that does not provide a desired level accuracy when using an index containing control information. The illustrative embodiments recognize and take into account that post-filtering performed on files in the search results can take more time to identify than desired. With post-filtering, the illustrative embodiments recognize and take into account that returning search results make take a longer amount of time than desired. As result, this type of filtering may not meet service level objectives (SLOs) in service level agreements (SLAs).

Therefore, it would be desirable to have a method and apparatus that take into account at least some of the issues discussed above, as well as other possible issues. For example, it would be desirable to have a method and apparatus that overcome a technical problem with searching data with the desired level of accuracy and speed.

Thus, illustrative examples provide a computer implemented method, apparatus, system, and computer program product for searching data such as data in files. For example, a candidate search result can be generated using an index for a data source in response to a search query by a user, wherein the candidate search result comprises files accessible by the user based on access control information in the index. A completed search result can be generated a completed search result with a set of the files from the candidate search result having a confidentiality level less than or equal to a threshold confidentiality level. A determination can be made as to whether the user has access to a file in the candidate search result in which the file has the confidentiality level greater the threshold confidentiality level for the data source. The file can be added in response to the file being accessible by the user in the data source to the completed search result. The completed search result can be presented as a response to the search query.

As used herein, a "set of" when used with reference items means one or more items. For example, a set of files is one or more files. In some illustrative examples, a set of files can also include a null set in which no files are present in the set of files.

With reference now to the figures and, in particular, with reference to FIG. 1, a pictorial representation of a network of data processing systems is depicted in which illustrative embodiments may be implemented. Network data processing system 100 is a network of computers in which the illustrative embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server computer 104 and server computer 106 connect to network 102 along with storage unit 108. In addition, client devices 110 connect to network 102. As depicted, client devices 110 include client computer 112, client computer 114, and client computer 116. Client devices 110 can be, for example, computers, workstations, or network computers. In the depicted example, server computer 104 provides information, such as boot files, operating system images, and applications to client devices 110. Further, client devices 110 can also include other types of client devices such as mobile phone 118, tablet computer 120, and smart glasses 122. In this illustrative example, server computer 104, server computer 106, storage unit 108, and client devices 110 are network devices that connect to network 102 in which network 102 is the communications media for these network devices. Some or all of client devices 110 may form an Internet of things (IoT) in which these physical devices can connect to network 102 and exchange information with each other over network 102.

Client devices 110 are clients to server computer 104 in this example. Network data processing system 100 may include additional server computers, client computers, and other devices not shown. Client devices 110 connect to network 102 utilizing at least one of wired, optical fiber, or wireless connections.

Program instructions located in network data processing system 100 can be stored on a computer-recordable storage media and downloaded to a data processing system or other device for use. For example, program instructions can be stored on a computer-recordable storage media on server computer 104 and downloaded to client devices 110 over network 102 for use on client devices 110.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers consisting of thousands of commercial, governmental, educational, and other computer systems that route data and messages. Of course, network data processing system 100 also may be implemented using a number of different types of networks. For example, network 102 can be comprised of at least one of the Internet, an intranet, a local area network (LAN), a metropolitan area network (MAN), or a wide area network (WAN). FIG. 1 is intended as an example, and not as an architectural limitation for the different illustrative embodiments.

As used herein, "a number of" when used with reference to items, means one or more items. For example, "a number of different types of networks" is one or more different types of networks.

Further, the phrase "at least one of," when used with a list of items, means different combinations of one or more of the listed items can be used, and only one of each item in the list may be needed. In other words, "at least one of" means any combination of items and number of items may be used from the list, but not all of the items in the list are required. The item can be a particular object, a thing, or a category.

For example, without limitation, "at least one of item A, item B, or item C" may include item A, item A and item B, or item B. This example also may include item A, item B, and item C or item B and item C. Of course, any combinations of these items can be present. In some illustrative examples, "at least one of" can be, for example, without limitation, two of item A; one of item B; and ten of item C; four of item B and seven of item C; or other suitable combinations.

In this illustrative example, search system 130 is located in server computer 104. Search system 130 can be an enterprise search system for an organization.

In this illustrative example, search system 130 can be used to search data such as, for example, files 132 in data source 134 in response to receiving search request 136 from user 138 operating browser 140 in client computer 112.

In this illustrative example, search system 130 can perform both pre-filtering 142 to generated candidate search result 148 and post-filtering 144 on a portion of candidate search result 148 to generate search result 146 for presentation to user 138. Search result 146 is returned in response 154 to client computer 112. Search result 146 identifies files 132 in data source 134 that can be viewed by user 138.

As depicted, post-filtering 144 can be selectively performed on a subset of candidate search result 148 rather than all of candidate search result 148. Post-filtering 144 can reduce the amount of time needed to generate and present search result 146 to user 138 based on the access rights for that user 138.

For example, candidate search result 148 can be determined by pre-filtering 142 using index 150 that includes access control information such as access control list (ACL) 152. In this illustrative example, access control list identifies what information user 138 can access in data source 134.

With candidate search result 148, a portion of the files in candidate search result 148 can be used in generating search result 146. The result can use those files that have a confidentiality level that is equal to or less than a threshold.

Search system 130 can use post-filtering 144 to identify additional files in candidate search result 148 for inclusion in search result 146. These additional files are files in candidate search result 148 that have a confidentiality level that is greater than the threshold.

In this example, post-filtering 144 can be performed by checking the access that user 138 currently has a data source 134. For example, this access can be checked by requesting files from data source 134 using access rights for user 138. Additional files having a confidentiality level greater than the threshold can be added to search result 146 for which user 138 has access to in data source 134 using post-filtering 144 for those files having a confidentiality level greater than the threshold. Search result 146 is returned and displayed to user 138 on browser 140 in client computer 112.

By using this process with less than all of the files returned in candidate search result 148, the time needed to generate search result 146 can be reduced as compared to processes using currently available search systems. As a result, search system 130 provides improved performance in searching files 132 in data source 134.

Figure 2:
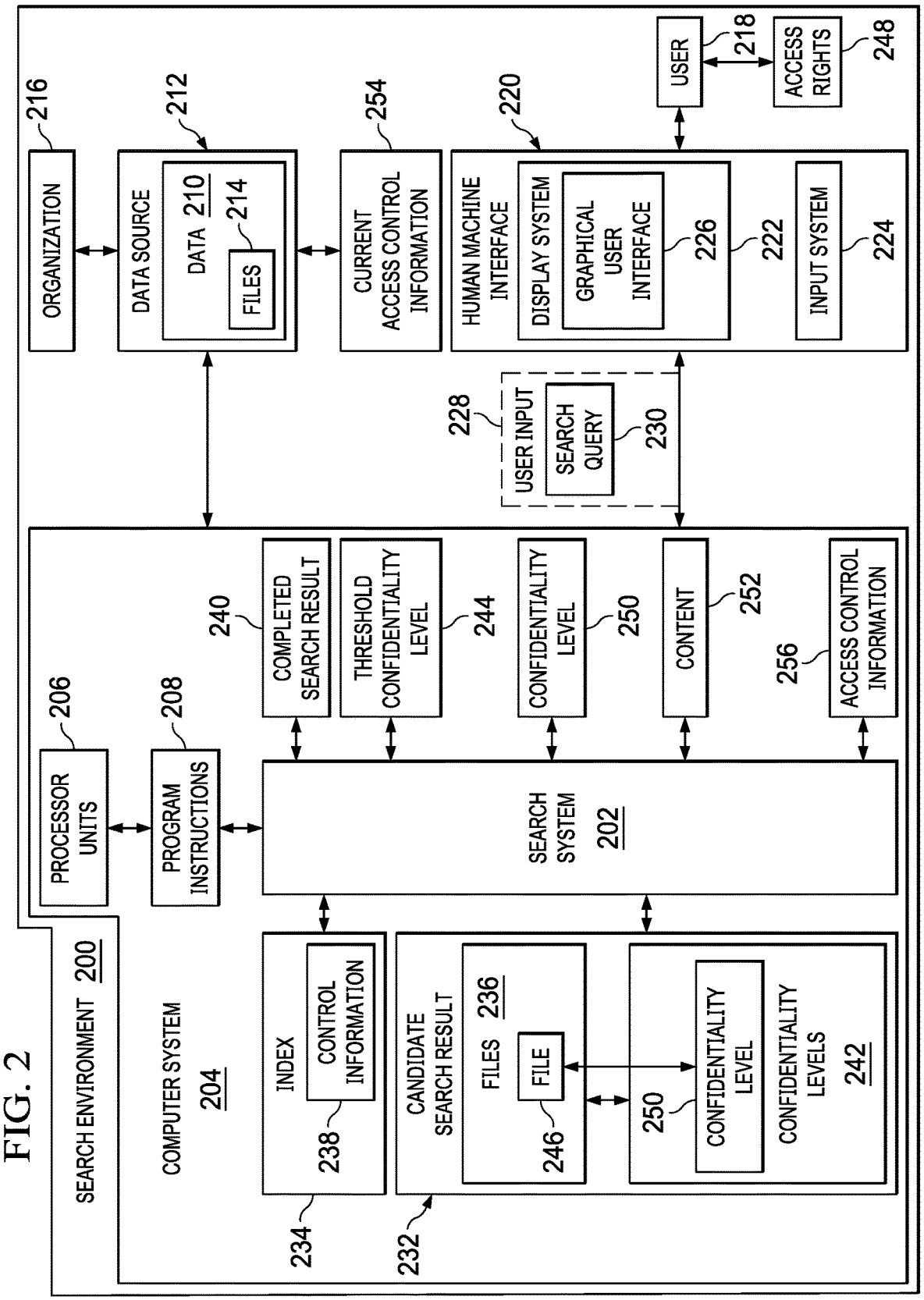
FIG. 2 is a block diagram of a search environment in accordance with an illustrative embodiment.

With reference now to FIG. 2, a block diagram of a search environment is depicted in accordance with an illustrative embodiment. In this illustrative example, search environment 200 includes components that can be implemented in hardware such as the hardware shown in network data processing system 100 in FIG. 1.

In this illustrative example, search system 202 is located in computer system 204 in search environment 200.

Search system 202 can be implemented in software, hardware, firmware or a combination thereof. When software is used, the operations performed by search system 202 can be implemented in program instructions configured to run on hardware, such as a processor unit. When firmware is used, the operations performed by search system 202 can be implemented in program instructions and data and stored in persistent memory to run on a processor unit. When hardware is employed, the hardware may include circuits that operate to perform the operations in search system 202.

In the illustrative examples, the hardware can take a form selected from at least one of a circuit system, an integrated circuit, an application specific integrated circuit (ASIC), a programmable logic device, or some other suitable type of hardware configured to perform a number of operations. With a programmable logic device, the device can be configured to perform the number of operations. The device can be reconfigured at a later time or can be permanently configured to perform the number of operations. Programmable logic devices include, for example, a programmable logic array, a programmable array logic, a field programmable logic array, a field programmable gate array, and other suitable hardware devices. Additionally, the processes can be implemented in organic components integrated with inorganic components and can be comprised entirely of organic components excluding a human being. For example, the processes can be implemented as circuits in organic semiconductors.

Computer system 204 is a physical hardware system and includes one or more data processing systems. When more than one data processing system is present in computer system 204, those data processing systems are in communication with each other using a communications medium. The communications medium can be a network. The data processing systems can be selected from at least one of a computer, a server computer, a tablet computer, or some other suitable data processing system.

As depicted, computer system 204 includes a number of processor units 206 that are capable of executing program instructions 208 implementing processes in the illustrative examples. As used herein a processor unit in the number of processor units 206 is a hardware device and is comprised of hardware circuits such as those on an integrated circuit that respond and process instructions and program code that operate a computer. When a number of processor units 206 execute program instructions 208 for a process, the number of processor units 206 is one or more processors units that can be on the same computer or on different computers. In other words, the process can be distributed between processors units on the same or different computers in a computer system. Further, the number of processor units 206 can be of the same type or different type of processors units. For example, a number of processor units can be selected from at least one of a single core processor, a dual-core processor, a multi-processor core, a general-purpose central processing unit (CPU), a graphics processing unit (GPU), a digital signal processor (DSP), or some other type of processor unit.

As depicted, search system 202 can operate to search data 210 in data source 212. In this illustrative example, data 210 takes the form of files 214. In this illustrative example, data source 212 can take a number of different forms. For example, data source 212 can be selected from of a file system, a database, a website, a data mart, a data warehouse, or some other source of data 210. Data source 212 is a part of organization 216 in which user 218 can perform searches using human machine interface 220.

Organization 216 can take a number of different forms. For example, organization 216 can be one of can be a company, an enterprise, a partnership, a charity, an educational group, a social group, a team, a city, a government agency, a department in a company, or some other suitable organization.

In illustrative example, files 214 can take a number of different forms. For example, files 214 can be selected from at least one of a document, a spreadsheet, a presentation, a slides, an image, a video, a program, an executable file, a configuration file, an audio file, or other suitable type of file.

In this illustrative example, human machine interface 220 comprises display system 222 and input system 224. Display system 222 is a physical hardware system and includes one or more display devices on which graphical user interface 226 can be displayed. The display devices can include at least one of a light emitting diode (LED) display, a liquid crystal display (LCD), an organic light emitting diode (OLED) display, a computer monitor, a projector, a flat panel display, a heads-up display (HUD), or some other suitable device that can output information for the visual presentation of information.

User 218 is a person who can interact with graphical user interface 226 through user input 228 generated by input system 224 for computer system 204. In this illustrative example, input system 224 is a physical hardware system and can be selected from at least one of a mouse, a keyboard, a trackball, a touchscreen, a stylus, a motion sensing input device, a gesture detection device, a cyber glove, or some other suitable type of input device.

In this illustrative example, search system 202 can operate to perform searches of data source 212 in response to receiving search query 230 in user input 228 generated by user 218. Search system 202 generates candidate search result 232 using index 234 for data source 212 in response to receiving search query 230 by user 218. As depicted, candidate search result 232 comprises files 236 accessible by user 218 based on access control information 238 in index 234.

This access control information is the access control information present when obtained from data source 212 to generate index 234. Access control information 238, can become stale or inaccurate over time. For example, permissions may change for users resulting in access control information 238 no longer current.

A file that is included in a search result can be included in the search result in a number of different ways. For example, the actual file itself can be in the search result, a universal resource locator to the file can be in the search report, or some other identification of the file can be included in the search result.

In this illustrative example, search system 202 generates completed search result 240 with a set of files 236 from candidate search result 232 having a set of confidentiality levels 242 less than or equal to threshold confidentiality level 244. In this illustrative example, the set of files 236 can be one or more files 236. In this example, the set of files 236 can be null set in which no files are present.

As depicted, the set of confidentiality levels 242 are associated with corresponding files in the set of files 236. In other words, each file in the set of files 236 has a confidentiality level in the set of confidentiality levels 242.

In processing search query 230, search system 202 determines whether user 218 has access to file 246 in candidate search result 232 in which file has confidentiality level 250 that is greater than threshold confidentiality level 244 for data source 212. Search system 202 adds file 246 from the set of files 236 in response to file 246 being accessible by user 218 in data source 212 to form completed search result 240.

The determination of whether user 218 has access to file 246 in data source 212 can be performed in a number of different ways. For example, search system 202 can attempt to access file 246 in data source 212 using access rights 248 for user 218 in which file 246 has confidentiality level 250 in confidentiality levels 242 greater threshold confidentiality level 244 for data source 212. In other words, search system 202 can actually send a request to access file 246 in data source 212 for user 218.

Access rights 248 for user 218 can be identified any number of different ways. For example, access rights 248 for user 218 can be identified in this request sent by search system 202 sending information such as a user identifier, a username, password, or some other user identifier that uniquely identifies user 218 to data source 212. Information used identify access rights 248 can also include a password or other information that can be used identify the access rights 248 that user 218 has to data 210 in data source 212. The information can also include identification of the group, a job title, or other information that can be used to determine access rights 248 for user 218.

In another illustrative example, the determination as to whether user 218 has access rights 248 can be determined by determining whether file 246 is assessable to user 218 using current access control information 254 for data source 212. For example, search system 202 may obtain or have access to current access control information 254 such as an access control list for data source 212.

The process of analyzing files from candidate search result 232 can be repeated until a sufficient number of entries are present in completed search result 240. For example, it may be desirable to always have at least 5 files, 10 files, 21 files or some other number of files in completed search result 240 for presentation to user 218.

In this illustrative example, search system 202 presents completed search result 240 as a response to search query 230. In this illustrative example, the presentation can be performed by displaying completed search result 240 in display system 222 in human machine interface 220. In other illustrative examples, human machine interface 220 may also have an audio system. When an audio system is present, the presentation of completed search result 240 can be performed using audio with a text-to-speech presentation. A combination of displaying an audio presentation may be warm in other illustrative examples.

In some illustrative examples, search system 202 can also generate index 234, which is used to generate candidate search result 232. For example, search system 202 can identifying files 214 in the data source 212. With the identification of files 214, search system 202 can determine content 252 and confidentiality level 250 for each file in files 214 based on content 252 in files 214 and access control information 256 for data source 212. In this illustrative example, access control information 256 is the access to information that is current at the time index 234 is generated. Search system 202 creates index 234 using content 252, access control information 256, and confidentiality levels 242 for files 214. In this illustrative example, index 234 contains information typically used to improve the speed for searching data, such as files 214 and data source 212. In this illustrative example, index 234 also includes access control information 256 for data source 212 and confidentiality levels 242.

In one illustrative example, one or more solutions are present that overcome a problem with the speed at which a search result can be returned. As a result, the illustrative examples provide one or more solutions may enable reducing the time needed to identify files for a search result in which the files having a confidentiality level that can be viewed by a user making a search query. In one illustrative example, an initial search is performed to identify data such as files in a data source for a candidate search result using an index.

In an illustrative example, the files in the search result have confidentiality levels. In an illustrative example, files having a confidentiality level equal to or below a threshold are included in a completed search result. Files having a confidentiality level greater than the threshold can be analyzed for inclusion in the completed search result based on whether the user has access to those files based on current control access information for the data source containing the files. As a result, this two-step approach reduces the amount of access needed to the data source, reducing the amount of time needed to generate the completed search result for presentation to the user.

Thus, in one or more illustrative examples, post-filtering of search data such as files having a low confidentiality can be omitted. As a result, the time needed to return a search result can be reduced using one or more illustrative examples.

Computer system 204 can be configured to perform at least one of the steps, operations, or actions described in the different illustrative examples using software, hardware, firmware or a combination thereof. As a result, computer system 204 operates as a special purpose computer system in which search system 202 in computer system 204 enables determining a search result with increased speed by reducing the amount of time needed to determine access for user to data based on current access control information for a data source. In particular, search system 202 transforms computer system 204 into a special purpose computer system as compared to currently available general computer systems that do not have search system 202.

In the illustrative example, the use of search system 202 in computer system 204 integrates processes into a practical application for searching data that increases the performance of computer system 204. In other words, search system 202 in computer system 204 is directed to a practical application of processes integrated into search system 202. Computer system 204 performs pre-filtering using an index to create a candidate search result and also performs post-filtering on a subset of files as part of a process for generating a completed search result. In this process, files in the candidate search result having confidentiality level being less than or equal to a threshold can be placed in the completed search result without additional steps to determine whether the user still has access to those files that have a confidentiality level less than or equal to the threshold confidentiality level. In this illustrative example, the use of search system 202 in computer system 204 results an improvement in the speed in which the completed search result can be generated.

Figure 3:
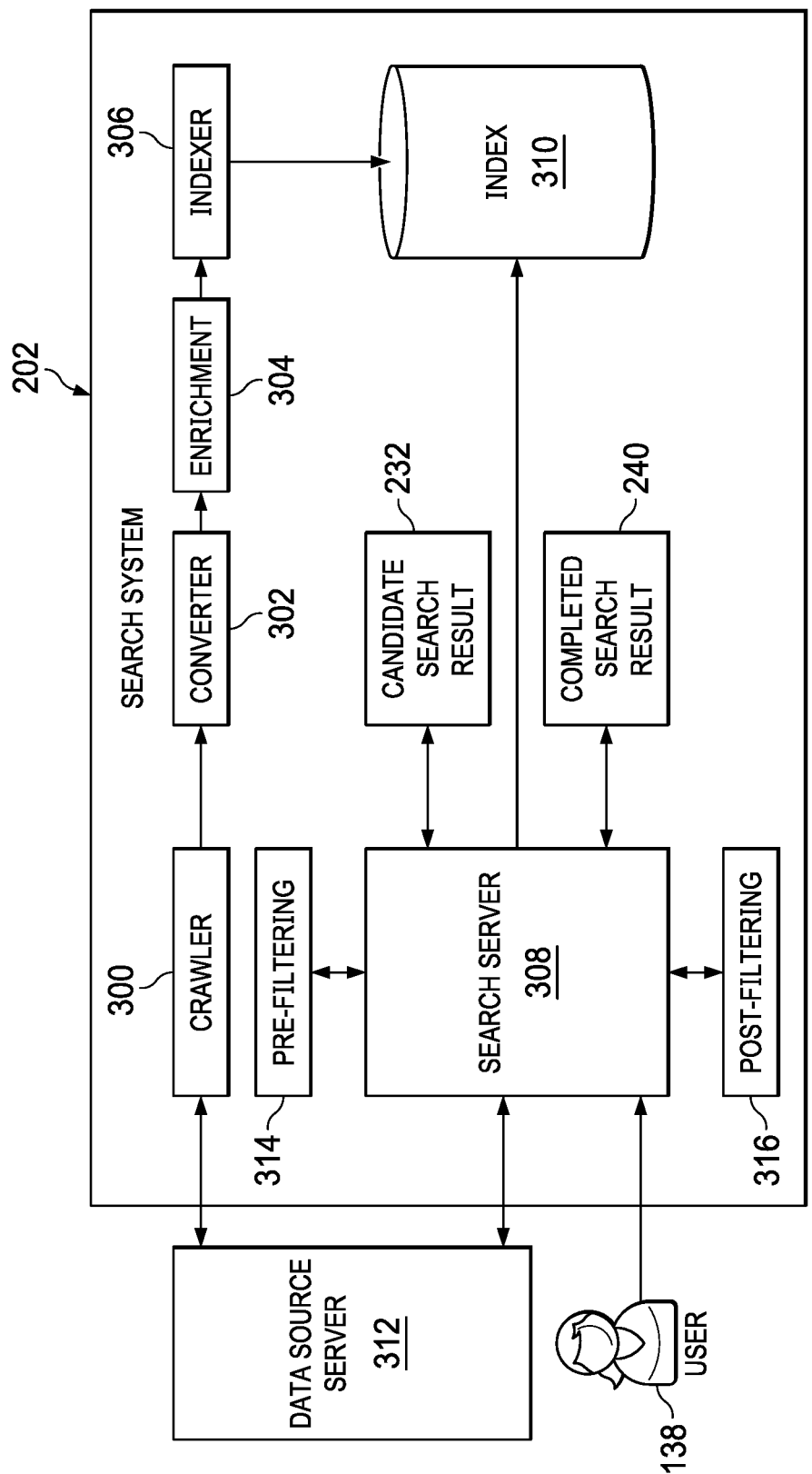
FIG. 3 is a search system in accordance with an illustrative embodiment.

Turning to FIG. 3, a search system is depicted in accordance with an illustrative embodiment. In this figure, examples of components that may be used to implement search system 202 in FIG. 2 are shown. In this example, search system 202 comprises crawler 300, converter 302, enrichment 304, indexer 306, search server 308, and index 310.

As depicted, crawler 300 can access data source server 312. Data source server 312 is an example of an implementation for data source 212 in FIG. 2. In this illustrative example, crawler 300 captures information from data source server 312. For example, crawler 300 can obtain data such as files, access control information, and other information from data source server 312. The access control information can be, for example, an access control lists for files in data source server 312. Crawler 300 can be implemented using currently available web crawlers or crawler applications that can consumer capture information from various systems such as data source server 312.

In this illustrative example, converter 302 can extract information from files or other data obtained from data source server 312. For example, converter 302 can identify text data, metadata, or other data from files such as documents obtained from data source server 312.

The information extracted by converter 302 can be analyzed by enrichment 304. With this analysis, enrichment 304 can add information such as a part of speech of a word, a sentiment, a meaning for words or phrases, or other information identified from analyzing text data metadata or other data extracted by converter 302.

For example, enrichment 304 can add information such as a part of speech for each word or phrase, an entity, sentiment, and other information. In addition, enrichment 304 can also add information such as a confidence level based on the content within the different files. Enrichment 304 can be performed using processes and algorithms currently available for speech analysis, entity analysis, sentiment analysis.

In this illustrative example, indexer 306 is a process that can create index 310 to facilitate more quickly searching files in data source server 312. This indexing can include information obtained from enrichment 304. Indexer 306 can be implemented using indexing software and processes that can collect information generated by converter 302 and enrichment 304 for determining files in data source server 312 that correspond to a search request. As result, index 310 created by indexer 306 can increase the speed at which search results can be generated for information in data source server 312 by using index 310 rather than having to send requests to data source server 312.

In this illustrative example, search server 308 is a process that can search for data such as documents in data source server 312 using index 310. Additionally, search server 308 can also search for data by sending requested data source server 312. In this illustrative example, pre-filtering 314 can be formed by search server 308 using index 310 and post-filtering 316 can be formed by search server 308 by attempting to access one or more of identified files from pre-filtering in data source server 312.

In this illustrative example, search server 308 performs pre-filtering 314 using access control information in index 310 to determine what files in index 310 determined to be responsive to a search request can be viewed by a user to form candidate search result 232. Search server 308 can perform post-filtering 316 to create a completed search result by attempting to access files identified the candidate search result in data source server 312. In illustrative example, a number of files for which access is attempted can be reduced using a threshold for confidentiality levels identified in index 310.

The illustration of search environment 200 in the different components in FIG. 2 and FIG. 3 is not meant to imply physical or architectural limitations to the manner in which an illustrative embodiment can be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

For example, search system 202 can omit components such as crawler 300, converter 302, enrichment 304, and indexer 306 in some implementations. The processes in these components can be performed in another component that generates index 310 for use by search system 202. In yet another illustrative example, one or more data sources in addition to data source 212 can be present in search environment 200 in FIG. 2. When more than one data source is present, index 234 in FIG. 2 can also provide indexing for the additional data source. In another illustrative example, another index can be present for the additional data source.

Turning next to FIG. 4, an illustration of a candidate search result is depicted in accordance with an illustrative embodiment. In this illustrative example, the candidate search result shown in table 400 comprises files in the form of documents. Table 400 is an example of search items that can be returned in candidate search results 232 in FIG. 2. In this illustrative example, these documents are responsive to a search query by user and are also viewable by the user based on the access control rights of the user.

In this illustrative example, table 400 has three columns, search item identifier 402, document identifier 404, and confidentiality level 406. Table 400 has four entries for files that are responsive to the search query and that the user can view or use. These entries include entry 408, entry 410, entry 412, and entry 414.

In this example, entry 408 contains document doc1 having a confidentiality level of 3. Entry 410 contains document doc2 having a confidentiality level of 0. Entry 412 contains document doc3 having a confidentiality level of 12, and entry 414 contains document doc4 having a confidentiality level of 11.

With reference next to FIG. 5, an illustration of a completed search result is depicted in accordance with an illustrative embodiment. As depicted, a completed search result is depicted in table 500. In this example, table 500 comprises two columns, results identifier 502 and document identifier 504.

Table 500 has three entries, entry 506, entry 508, and entry 510. Entry 506 contains document doc1 from entry 408 in table 400. Entry 508 contains document doc2 from entry 410 in table 400, and entry 510 contains document doc4 from entry 414 in table 400.

In this illustrative example, post-filtering is performed to generate the completed search result in table 500. In this example, the threshold confidentiality level is 5 in this depicted example. As a result, doc1 and doc2 are added to table 500 in entry 506 and entry 508, respectively. In this example, doc3 is not added because the user does not have an access right to this document. In this example, the determination is made by attempting to access the document at the document source. As depicted, doc4 is added as entry 510 because the user does an access right to this document. This determination is made by attempting to access doc4 in the data source using the access rights for the user.

In this example, the post-filtering is not performed on low confidentiality level documents, doc1 and doc2, as determined by the threshold confidentiality level. Post-filtering of documents, doc3 and doc4, having confidentiality levels above the threshold confidentiality level is formed. As result, the completed search results can be generated without having to perform post-processing on doc1 and doc2.

Figure 6:
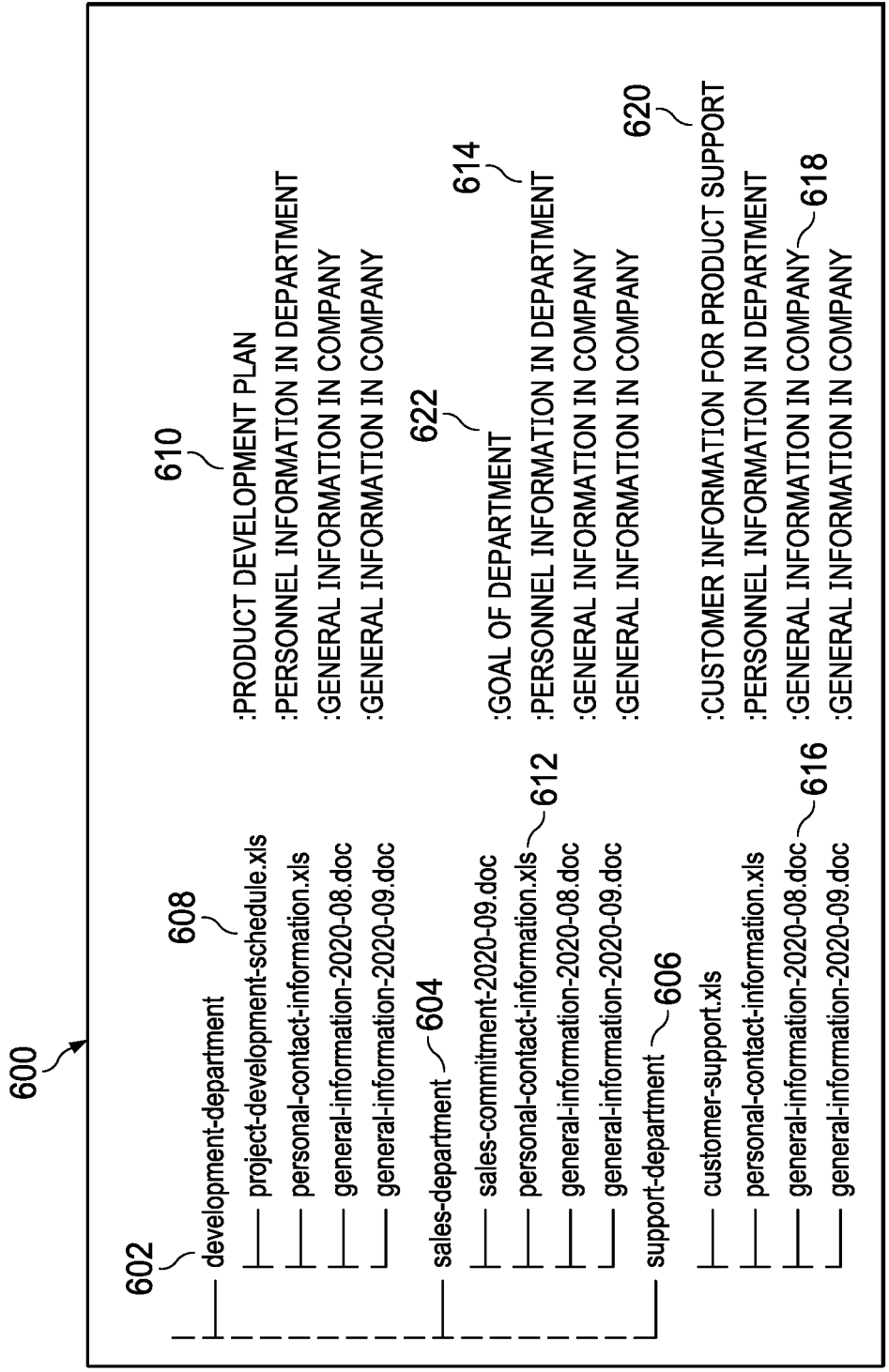
FIG. 6 is an illustration of a directories in an organization used to determine confidentiality levels in accordance with an illustrative embodiment.

With reference now to FIG. 6, an illustration of a directories in an organization used to determine confidentiality levels is depicted in accordance with an illustrative embodiment. In this example, directory structure 600 comprises 3 directories in which files are present. As depicted, these directories comprise development department 602, sales department 604, and support department 606.

In this illustrative example, the directories contain files with metadata. The metadata describe the type of information contained in the files. For example, in development department 602, product-development-schedule.xls 608 is a spreadsheet file and the metadata is "product development plan" 610. As another example, in sales department 604, file personal-contact-information.xls 612 is a spreadsheet. The metadata for this file is "personnel information in department" 614. In yet another example, in support department 606, the file general-information-2020-08.doc 616 is a document that has metadata "general information in company" 618.

As depicted, this metadata can be used to determine confidentiality levels for the different files in the directories in directory structure 600. In this example, when the metadata is "general information in company" 618, a confidentiality level of a file with this metadata can be sufficiently low that can be placed into the completed search results without additional processing to determine whether the user can access the file based on the current access control information for the data source such as access control lists for directory structure 600. In this example, other metadata such as "product development plan" 610, "personnel information department" 614, "goal of department", and "customer information for product support" 620 can be designated as being above the threshold of general "information in the company". The files with this metadata can be further processed by attempting to access these files using the access rights for the user.

As a result, the files in directory structure 600 can be returned as search items viewable by a user based on the access control rights in the index used to determine these search items for the candidate search results. The additional processing of search items having the metadata "general information in company" can be omitted with these search items being equal to or below the threshold confidentiality level for this example. As a result, less processing can be performed in determining the completed search result for presentation to a user.

Figure 7:
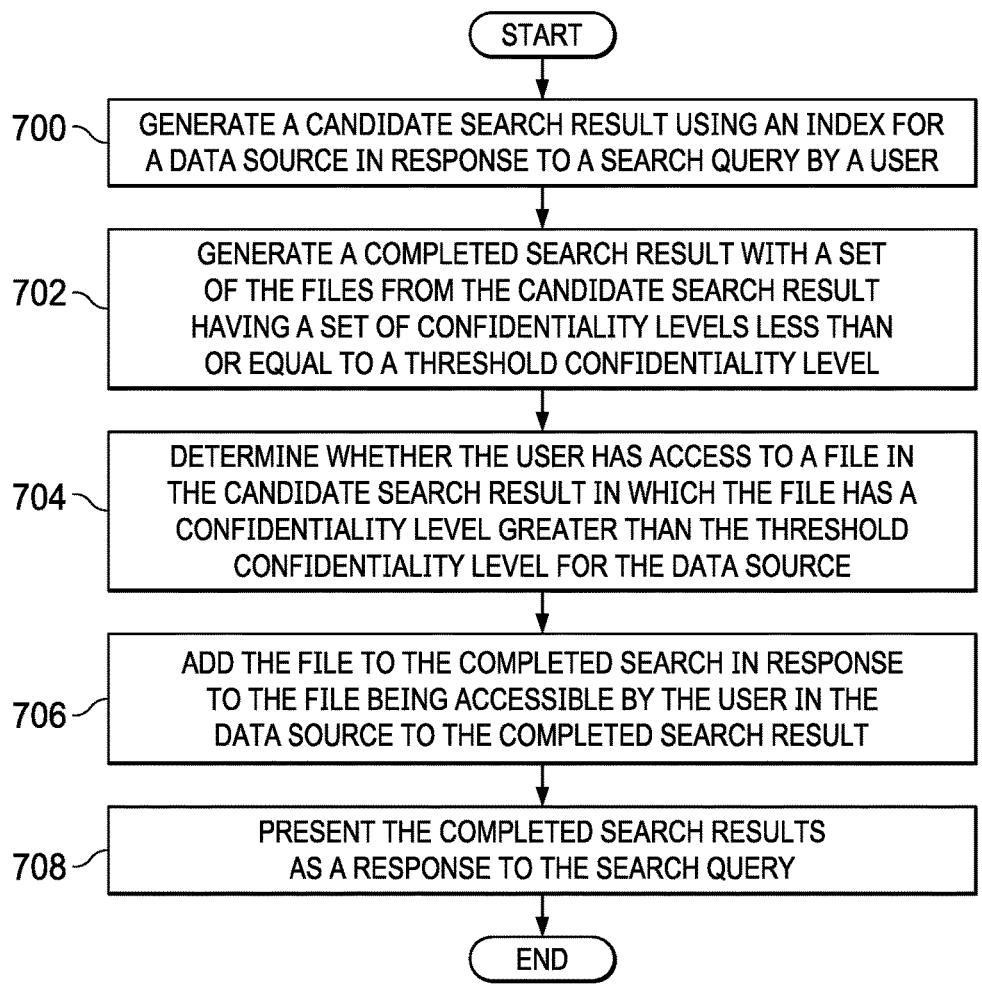
FIG. 7 is a flowchart of a process for searching data in accordance with an illustrative embodiment.

With reference to FIG. 7, a flowchart of a process for searching data is depicted in accordance with an illustrative embodiment. The process in FIG. 7 can be implemented in hardware, software, or both. When implemented in software, the process can take the form of program instructions that is run by one of more processor units located in one or more hardware devices in one or more computer systems. For example, the process can be implemented in search system 130 in server computer 104 in FIG. 1 and search system 202 in computer system 204 in FIG. 2.

The process begins by generating a candidate search result using an index for a data source in response to a search query by a user (step 700). In step 700, the candidate search result comprises files responsive to the search query which are also accessible by the user based on access control information in the index.

The process generates a completed search result with a set of the files from the candidate search result having a set of confidentiality levels less than or equal to a threshold confidentiality level (step 702). The process determines whether the user has access to a file in the candidate search result in which the file has a confidentiality level greater the threshold confidentiality level for the data source (step 704).

The process adds the file to the completed search in response to the file being accessible by the user in the data source to the completed search result (step 706). The process presents the completed search result as a response to the search query (step 708). The process terminates thereafter. In this flowchart, step 704 and step 706 can be performed for some or all of the files that have a confidentiality level greater than the threshold confidentiality level. For example, these steps can be performed until a sufficient number of files are present in the completed search result. The number of files can be, for example, 4, 7, 11, 18, or some other suitable number of files.

Figure 8:
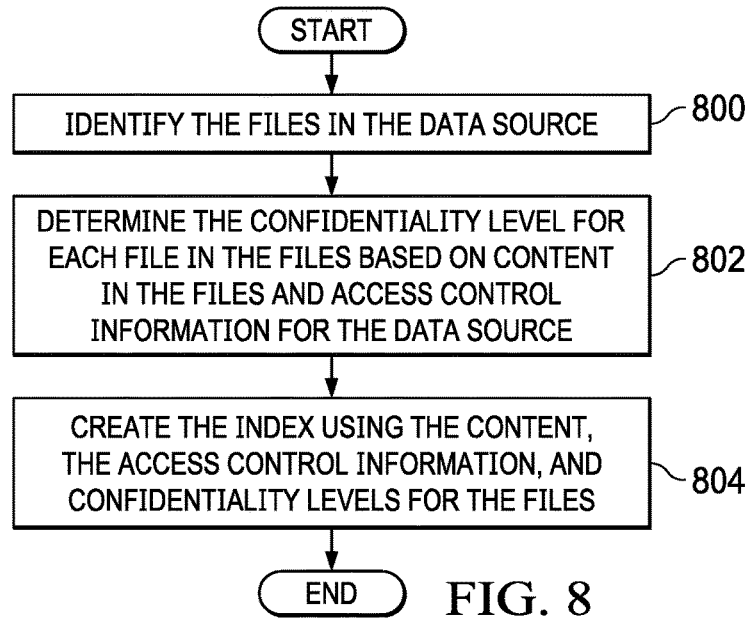
FIG. 8 is a flowchart of a process for creating an index in accordance with an illustrative embodiment.

Turning to FIG. 8, a flowchart of a process for creating an index is depicted in accordance with an illustrative embodiment. The steps illustrated in FIG. 8 are examples of steps that can be formed in addition to the steps in FIG. 7.

The process begins by identifying the files in the data source (step 800). In step 800, the files can be identified in the data source by capturing the files in the access control information from the data source using a process such as that in a crawler. The process determines the confidentiality level for each file in the files based on content in the files and access control information for the data source (step 802).

The process creates the index using the content, the access control information, and confidentiality levels for the files (step 804). The process terminates thereafter. In step 804, the index can include the contents, enrichment information determined from the content, the access control information, and the confidentiality levels determined for the files.

Figure 9:
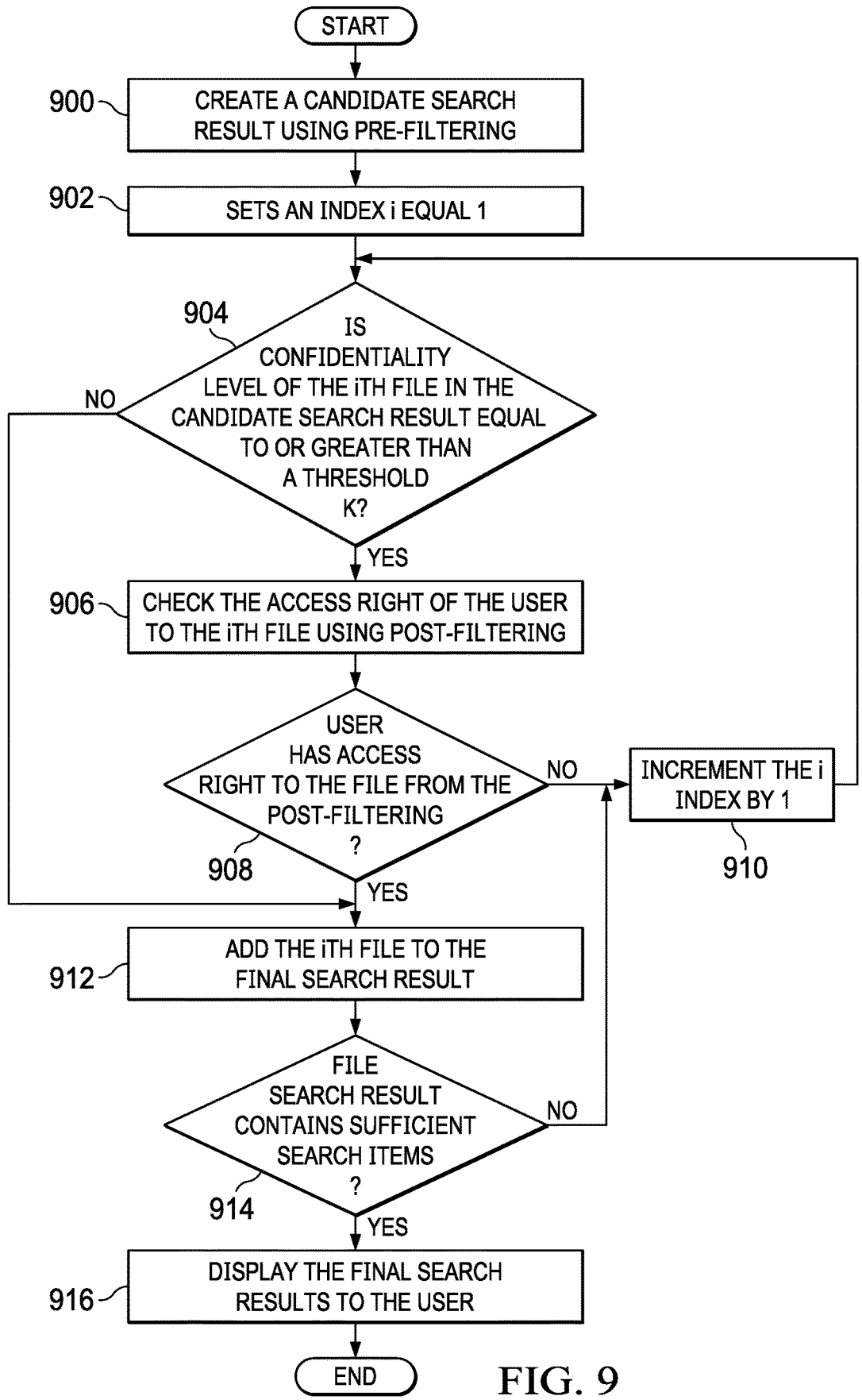
FIG. 9 is a more detailed flowchart of a process for searching data in accordance with an illustrative embodiment.

Turning next to FIG. 9, a more detailed flowchart of a process for searching data is depicted in accordance with an illustrative embodiment. The process in FIG. 9 can be implemented in hardware, software, or both. When implemented in software, the process can take the form of program instructions that is run by one of more processor units located in one or more hardware devices in one or more computer systems. For example, the process can be implemented in search system 130 in server computer 104 in FIG. 1 and search system 202 in computer system 204 in FIG. 2.

The process begins by creating a candidate search result using pre-filtering (step 900). The process sets an index i equal 1 (step 902). The process determines whether the confidentiality level of the ith file in the candidate search result is equal to or greater than a threshold K (step 904). If the confidentiality level is equal to or greater than the threshold K, process checks the access right of the user to the ith file using post-filtering (step 906). In step 906, the post-filtering is performed by attempting to access the ith file at the data source using access rights for the user.

The process determines whether the user has access right to the file from the post-filtering (step 908). If the user does not have the access right to the file, the process increments the index i by 1 (step 910). The process then returns to step 904 as described above.

With reference again to step 908, if the user does have access rights, the process adds the ith file to the final search result (step 912). The process then determines whether the file search result contains sufficient search items (step 912). If the final search result does not contain sufficient search items, the process returns to step 910. Otherwise, the process displays the final search results to the user (step 916). The process terminates thereafter.

Turning back to step 904, if the confidentiality level of the ith file in the candidate search report is not greater than or equal to the threshold K, the process also proceeds to step 912. As described above, this ith file is added to the final search result.

Figure 10:
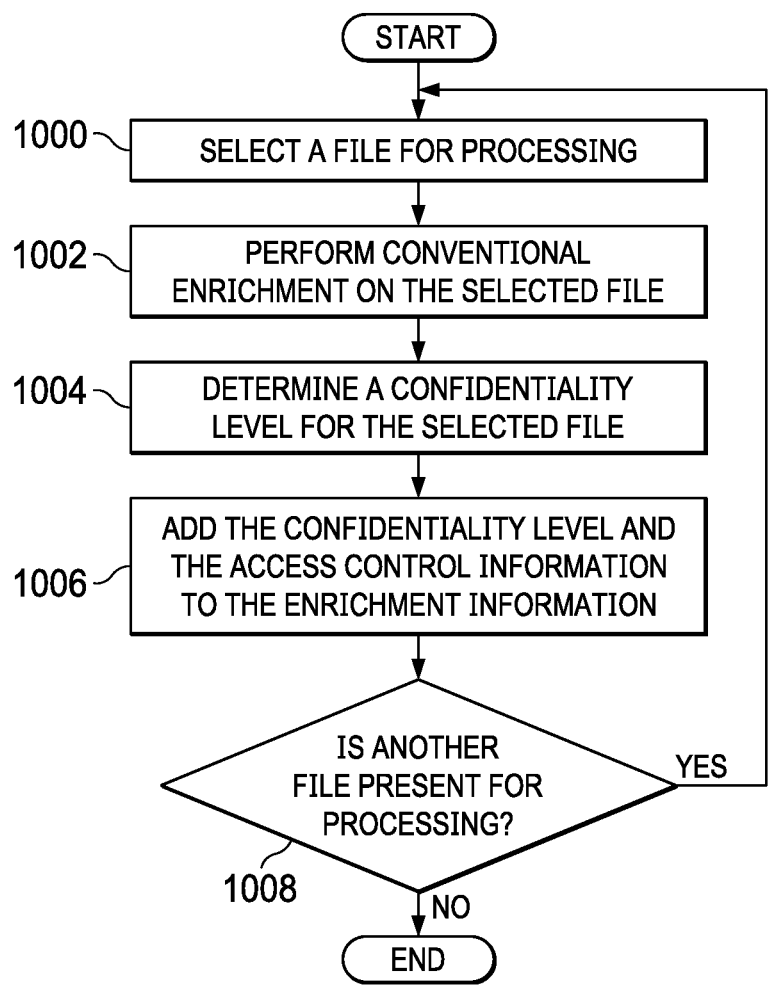
FIG. 10 is a flowchart of a process for enrichment of data is depicted in accordance with an illustrative embodiment.

Turning next to FIG. 10, a flowchart of a process for enrichment of data is depicted in accordance with an illustrative embodiment. The process in FIG. 10 can be implemented in hardware, software, or both. When implemented in software, the process can take the form of program instructions that is run by one of more processor units located in one or more hardware devices in one or more computer systems. For example, the process can be implemented in search system 130 in server computer 104 in FIG. 1 and search system 202 in computer system 204 in FIG. 2.

The process begins by selecting a file for processing (step 1000). The process performs conventional enrichment on the selected file (step 1002). In this illustrative example, engine enrichment can be performed using currently available enrichment processes in software that identify information such as part of speed for a word or phrase, an entity referenced in a file, and other information that can be identified from the content of a file.

The process then determines a confidentiality level for the selected file (step 1004). In step 1004, the confidentiality level can be determined using at least one of the information determined in conventional enrichment in step 1002 or access control information for the data source.

Confidentiality level can be calculated using the content of the file as well as metadata profile. Metadata can access control information, information determined through enrichment, or other sources of information described in the file.

In this illustrative example, the confidentiality level can calculated through a number of additions or subtractions of values to the confidentiality. For example, text containing a particular product name can increment the confidentiality level by 1. Text containing a particular company name can increment the confidentiality level by 1. As another example, text containing a person's name can increment the confidentiality level by 1, and text containing letters "Confidential" can increment the confidentiality level by 10.

As another example, if an access control list in the metadata contains an access control representing all employees, confidentiality level can be decremented by 1. As another example, if the access control list does not contain representing the entire department, +2 confidentiality can be implemented by 2. As result of these and other types of calculation, a confidentiality level can be determined in step 1004.

The process adds the confidentiality level and the access control information to the enrichment information (step 1006). The process then determines whether another file is present for processing (step 1008). If another file is present, process returns to step 1000. Otherwise, the process terminates. The enrichment information can be used to determine confidentiality levels for the files and also can be used to create the index.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent at least one of a module, a segment, a function, or a portion of an operation or step. For example, one or more of the blocks can be implemented as program instructions, hardware, or a combination of the program instructions and hardware. When implemented in hardware, the hardware may, for example, take the form of integrated circuits that are manufactured or configured to perform one or more operations in the flowcharts or block diagrams. When implemented as a combination of program instructions and hardware, the implementation may take the form of firmware. Each block in the flowcharts or the block diagrams can be implemented using special purpose hardware systems that perform the different operations or combinations of special purpose hardware and program instructions run by the special purpose hardware.

In some alternative implementations of an illustrative embodiment, the function or functions noted in the blocks may occur out of the order noted in the figures. For example, in some cases, two blocks shown in succession can be performed substantially concurrently, or the blocks may sometimes be performed in the reverse order, depending upon the functionality involved. Also, other blocks can be added in addition to the illustrated blocks in a flowchart or block diagram.

Figure 11:
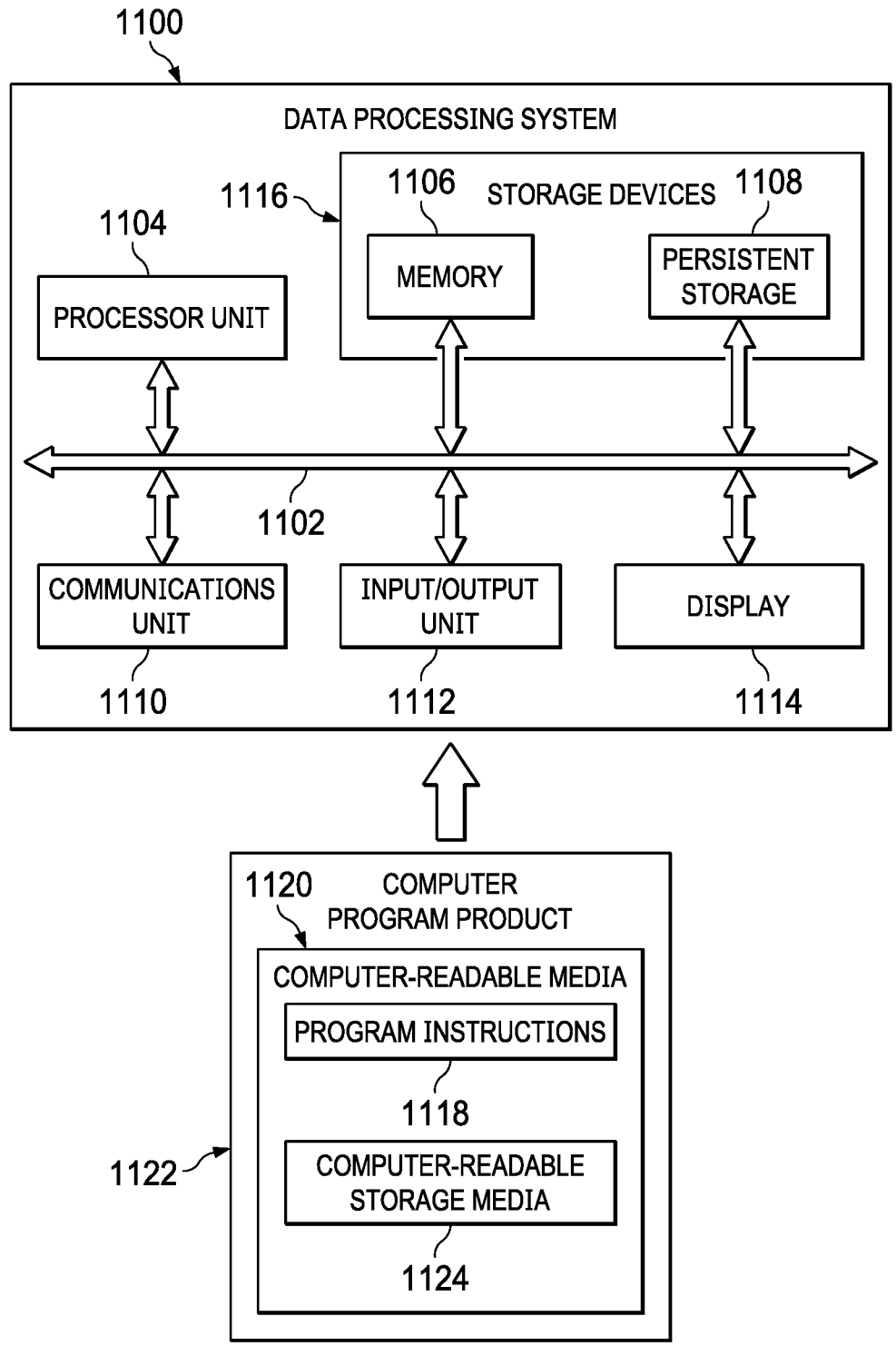
FIG. 11 is a block diagram of a data processing system in accordance with an illustrative embodiment.

Turning now to FIG. 11, a block diagram of a data processing system is depicted in accordance with an illustrative embodiment. Data processing system 1100 can be used to implement server computer 104, server computer 106, client devices 110, in FIG. 1. Data processing system 1100 can also be used to implement computer system 204 in FIG. 2. In this illustrative example, data processing system 1100 includes communications framework 1102, which provides communications between processor unit 1104, memory 1106, persistent storage 1108, communications unit 1110, input/output (I/O) unit 1112, and display 1114. In this example, communications framework 1102 takes the form of a bus system.

Processor unit 1104 serves to execute instructions for software that can be loaded into memory 1106. Processor unit 1104 includes one or more processors. For example, processor unit 1104 can be selected from at least one of a multicore processor, a central processing unit (CPU), a graphics processing unit (GPU), a physics processing unit (PPU), a digital signal processor (DSP), a network processor, or some other suitable type of processor. Further, processor unit 1104 can may be implemented using one or more heterogeneous processor systems in which a main processor is present with secondary processors on a single chip. As another illustrative example, processor unit 1104 can be a symmetric multi-processor system containing multiple processors of the same type on a single chip.

Memory 1106 and persistent storage 1108 are examples of storage devices 1116. A storage device is any piece of hardware that is capable of storing information, such as, for example, without limitation, at least one of data, program instructions in functional form, or other suitable information either on a temporary basis, a permanent basis, or both on a temporary basis and a permanent basis. Storage devices 1116 may also be referred to as computer-readable storage devices in these illustrative examples. Memory 1106, in these examples, can be, for example, a random-access memory or any other suitable volatile or non-volatile storage device. Persistent storage 1108 may take various forms, depending on the particular implementation.

For example, persistent storage 1108 may contain one or more components or devices. For example, persistent storage 1108 can be a hard drive, a solid-state drive (SSD), a flash memory, a rewritable optical disk, a rewritable magnetic tape, or some combination of the above. The media used by persistent storage 1108 also can be removable. For example, a removable hard drive can be used for persistent storage 1108.

Communications unit 1110, in these illustrative examples, provides for communications with other data processing systems or devices. In these illustrative examples, communications unit 1110 is a network interface card.

Input/output unit 1112 allows for input and output of data with other devices that can be connected to data processing system 1100. For example, input/output unit 1112 may provide a connection for user input through at least one of a keyboard, a mouse, or some other suitable input device. Further, input/output unit 1112 may send output to a printer. Display 1114 provides a mechanism to display information to a user.

Instructions for at least one of the operating system, applications, or programs can be located in storage devices 1116, which are in communication with processor unit 1104 through communications framework 1102. The processes of the different embodiments can be performed by processor unit 1104 using computer-implemented instructions, which may be located in a memory, such as memory 1106.

These instructions are referred to as program instructions, computer usable program instructions, or computer-readable program instructions that can be read and executed by a processor in processor unit 1104. The program instructions in the different embodiments can be embodied on different physical or computer-readable storage media, such as memory 1106 or persistent storage 1108.

Program instructions 1118 is located in a functional form on computer-readable media 1120 that is selectively removable and can be loaded onto or transferred to data processing system 1100 for execution by processor unit 1104. Program instructions 1118 and computer-readable media 1120 form computer program product 1122 in these illustrative examples. In the illustrative example, computer-readable media 1120 is computer-readable storage media 1124.

Computer-readable storage media 1124 is a physical or tangible storage device used to store program instructions 1118 rather than a medium that propagates or transmits program instructions 1118. Computer-readable storage media 1124, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Alternatively, program instructions 1118 can be transferred to data processing system 1100 using a computer-readable signal media. The computer-readable signal media are signals and can be, for example, a propagated data signal containing program instructions 1118. For example, the computer-readable signal media can be at least one of an electromagnetic signal, an optical signal, or any other suitable type of signal. These signals can be transmitted over connections, such as wireless connections, optical fiber cable, coaxial cable, a wire, or any other suitable type of connection.

Further, as used herein, "computer-readable media 1120" can be singular or plural. For example, program instructions 1118 can be located in computer-readable media 1120 in the form of a single storage device or system. In another example, program instructions 1118 can be located in computer-readable media 1120 that is distributed in multiple data processing systems. In other words, some instructions in program instructions 1118 can be located in one data processing system while other instructions in program instructions 1118 can be located in one data processing system. For example, a portion of program instructions 1118 can be located in computer-readable media 1120 in a server computer while another portion of program instructions 1118 can be located in computer-readable media 1120 located in a set of client computers.

The different components illustrated for data processing system 1100 are not meant to provide architectural limitations to the manner in which different embodiments can be implemented. In some illustrative examples, one or more of the components may be incorporated in or otherwise form a portion of, another component. For example, memory 1106, or portions thereof, may be incorporated in processor unit 1104 in some illustrative examples. The different illustrative embodiments can be implemented in a data processing system including components in addition to or in place of those illustrated for data processing system 1100. Other components shown in FIG. 11 can be varied from the illustrative examples shown. The different embodiments can be implemented using any hardware device or system capable of running program instructions 1118.

Thus, illustrative embodiments of the present invention provide a computer implemented method, computer system, and computer program product for searching data. A number of processor units generates a candidate search result using an index for a data source in response to a search query by a user, wherein the candidate search result comprises files accessible by the user based on access control information in the index. The number of processor units generates a completed search result with a set of the files from the candidate search result having a confidentiality level less than or equal to a threshold confidentiality level. The number of processor units determines whether the user has access to a file in the candidate search result in which the file has the confidentiality level greater than the threshold confidentiality level for the data source. The number of processor units adds the file in response to the file being accessible by the user in the data source to the completed search result.

In one or more illustrative examples, the searching process reduces the time needed to generate and present a search result to a user. A candidate search result is determined based on pre-filtering in which a search performed for the search request in an index for the data source. The candidate search result identifies files for which the user can view based on the access rights of the user. The final search result can be generated based on a portion of the files having confidentiality levels equal to or less than a threshold. Files in the candidate search result having a confidentiality level greater than the threshold can be processed to determine whether the user has rights to those files at the data source as a second step in generating the final search result.

For example, the process can attempt to access these files using the data rights of the user. In this manner, changes in access control information at the data source can be taken into account with respect to files in the data source that have a confidentiality level higher than the threshold. As result, the number of files that need to be processed in this manner can be reduced, reducing the amount of time needed to generate the complete search result.

The description of the different illustrative embodiments has been presented for purposes of illustration and description and is not intended to be exhaustive or limited to the embodiments in the form disclosed. The different illustrative examples describe components that perform actions or operations. In an illustrative embodiment, a component can be configured to perform the action or operation described. For example, the component can have a configuration or design for a structure that provides the component an ability to perform the action or operation that is described in the illustrative examples as being performed by the component. Further, to the extent that terms "includes", "including", "has", "contains", and variants thereof are used herein, such terms are intended to be inclusive in a manner similar to the term "comprises" as an open transition word without precluding any additional or other elements.

The descriptions of the various embodiments of the present invention have been presented for purposes of illustration, but are not intended to be exhaustive or limited to the embodiments disclosed. Not all embodiments will include all of the features described in the illustrative examples. Further, different illustrative embodiments may provide different features as compared to other illustrative embodiments. Many modifications and variations will be apparent to those of ordinary skill in the art without departing from the scope and spirit of the described embodiment. The terminology used herein was chosen to best explain the principles of the embodiment, the practical application or technical improvement over technologies found in the marketplace, or to enable others of ordinary skill in the art to understand the embodiments disclosed here.

What is claimed is:

1. A computer implemented method for searching data, the computer implemented method comprising:
    generating, by a number of processor units, a candidate search result using an index for a data source in response to a search query by a user, wherein the candidate search result comprises files accessible by the user based on access control information in the index;
    generating, by the number of processor units, a completed search result with a set of the files from the candidate search result having a set of confidentiality levels less than or equal to a threshold confidentiality level;
    determining, by the number of processor units, whether the user has access to a file in the candidate search result in which the file has a confidentiality level greater than the threshold confidentiality level for the data source;
    adding, by the number of processor units, the file to the completed search result in response to the file being accessible by the user in the data source; and
    presenting, by the number of processor units, the completed search result as a response to the search query.

2. The computer implemented method of claim 1 further comprising:
    repeating, by the number of processor units, the steps of determining and adding until a sufficient number of entries are present in the completed search result.

3. The computer implemented method of claim 1 further comprising:
    identifying, by the number of processor units, the files in the data source;
    determining, by the number of processor units, the confidentiality level for each file in the files based on content in the files and access control information for the data source; and
    creating, by the number of processor units, the index using the content, the access control information, and confidentiality levels for the files.

4. The computer implemented method of claim 3, wherein identifying the files in the data source comprises:
    capturing, by the number of processor units, the files and the access control information from the data source using a crawler.

5. The computer implemented method of claim 1, wherein determining, by the number of processor units, whether the user has access to the file in the candidate search result in which the file has the confidentiality level greater than the threshold confidentiality level for the data source comprises:
    attempting, by the number of processor units, to access the file in the data source using access rights for the user in which the file has the confidentiality level greater than the threshold confidentiality level for the data source.

6. The computer implemented method of claim 1, wherein determining, by the number of processor units, whether the user has access to the file in the candidate search result in which the file has the confidentiality level greater than the threshold confidentiality level for the data source comprises:
    determining whether the file is accessible to the user using a current access control information for the data source.

7. The computer implemented method of claim 1, wherein the data source is one of a file system, a database, a website, a data mart, and a data warehouse.

8. A computer system comprising:
    a number of processor units, wherein the number of processor units executes program instructions to:
        generate a candidate search result using an index for a data source in response to a search query by a user, wherein the candidate search result comprises files accessible by the user based on access control information in the index;
        generate a completed search result with a set of the files from the candidate search result having a set of confidentiality levels less than or equal to a threshold confidentiality level;
        determine whether the user has access to a file in the candidate search result in which the file has a confidentiality level greater than the threshold confidentiality level for the data source;
        add the file in response to the file to the completed search in response to the file being accessible by the user in the data source; and
        present the completed search result as a response to the search query.

9. The computer system of claim 8, wherein the number of processor units executes program instructions to:
    repeat, by the number of processor units, the steps of determining and adding until a sufficient number of entries are present in the completed search result.

10. The computer system of claim 8, wherein the number of processor units executes program instructions to:
    identify the files in the data source;
    determine the confidentiality level for each file in the files based on content in the files and access control information for the data source; and
    create the index using the content, the access control information, and confidentiality levels for the files.

11. The computer system of claim 10, wherein in identifying the files in the data source, the number of processor units executes program instructions to:
    capture the files and the access control information from the data source using a crawler.

12. The computer system of claim 8, wherein in determining, by the number of processor units, whether the user has access to the file in the candidate search result in which the file has the confidentiality level greater than the threshold confidentiality level for the data source, the number of processor units executes program instructions to:
  attempt to access the file in the data source using access rights for the user in which the file has the confidentiality level greater than the threshold confidentiality level for the data source.

13. The computer system of claim 8, wherein in determining, by the number of processor units, whether the user has access to the file in the candidate search result in which the file has the confidentiality level greater than the threshold confidentiality level for the data source, the number of processor units executes program instructions to:
  determines whether the file is accessible to the user using a current access control information for the data source.

14. The computer system of claim 8, wherein the data source is of a file system, a database, a website, a data mart, and a data warehouse.

15. A computer program product for searching data, the computer program product comprising a computer-readable storage medium having program instructions embodied therewith, the program instructions executable by a computer system to cause the computer system to perform a method of:
  generating, by a number of processor units, a candidate search result using an index for a data source in response to a search query by a user, wherein the candidate search result comprises files accessible by the user based on access control information in the index;
  generating, by the number of processor units, a completed search result with a set of the files from the candidate search result having a set of confidentiality levels less than or equal to a threshold confidentiality level;
  determining, by the number of processor units, whether the user has access to a file in the candidate search result in which the file has the confidentiality level greater than the threshold confidentiality level for the data source;
  adding, by the number of processor units, the file to the completed search result in response to the file being accessible by the user in the data source; and
  presenting, by the number of processor units, the completed search result as a response to the search query.

16. The computer program product of claim 15 further comprising:
  repeating, by the number of processor units, the steps of determining and adding until a sufficient number of entries are present in the completed search result.

17. The computer program product of claim 15 further comprising:
  identifying, by the number of processor units, the files in the data source;
  determining, by the number of processor units, the confidentiality level for each file in the files based on content in the files and access control information for the data source; and
  creating, by the number of processor units, the index using the content, the access control information, and confidentiality levels for the files.

18. The computer program product of claim 17, wherein identifying the files in the data source comprises:
  capturing, by the number of processor units, the files and the access control information from the data source using a crawler.

19. The computer program product of claim 15, wherein determining, by the number of processor units, whether the user has access to the file in the candidate search result in which the file has the confidentiality level greater than the threshold confidentiality level for the data source comprises:
  attempting, by the number of processor units, to access the file in the data source using access rights for the user in which the file has the confidentiality level greater than the threshold confidentiality level for the data source.

20. The computer program product of claim 15, wherein determining, by the number of processor units, whether the user has access to the file in the candidate search result in which the file has the confidentiality level greater than the threshold confidentiality level for the data source comprises:
  determining whether the file is accessible to the user using a current access control information for the data source.

* * * * *